US010637094B2

United States Patent
Ose et al.

(10) Patent No.: US 10,637,094 B2
(45) Date of Patent: Apr. 28, 2020

(54) ANODE MIXTURE FOR ALL-SOLID-STATE LITHIUM ION SECONDARY BATTERY, ANODE COMPRISING THE ANODE MIXTURE, AND ALL-SOLID-STATE LITHIUM ION SECONDARY BATTERY COMPRISING THE ANODE

(71) Applicant: TOYOTA JIDOSHA KABUSHIKI KAISHA, Toyota-shi, Aichi-ken (JP)

(72) Inventors: Norihiro Ose, Sunto-gun (JP); Hajime Hasegawa, Susono (JP); Yusuke Kintsu, Susono (JP); Mitsutoshi Otaki, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 57 days.

(21) Appl. No.: 15/950,621

(22) Filed: Apr. 11, 2018

(65) Prior Publication Data
US 2018/0301746 A1 Oct. 18, 2018

(30) Foreign Application Priority Data
Apr. 18, 2017 (JP) .................................. 2017-082276

(51) Int. Cl.
| *H01M 4/38* | (2006.01) |
| *H01M 4/62* | (2006.01) |
| *H01M 10/0525* | (2010.01) |
| *H01M 10/0562* | (2010.01) |
| *H01M 4/02* | (2006.01) |

(52) U.S. Cl.
CPC ....... *H01M 10/0525* (2013.01); *H01M 4/386* (2013.01); *H01M 4/625* (2013.01); *H01M 10/0562* (2013.01); *H01M 2004/027* (2013.01); *H01M 2300/0068* (2013.01)

(58) Field of Classification Search
CPC ......... H01M 10/0525; H01M 10/0562; H01M 4/625; H01M 4/386; H01M 2004/027; H01M 2300/0068
See application file for complete search history.

(56) References Cited

U.S. PATENT DOCUMENTS

| 2012/0009484 A1* | 1/2012 | Aburatani ................. C03C 1/02 429/322 |
| 2015/0002101 A1* | 1/2015 | Hasegawa ............. H01M 4/505 320/134 |
| 2015/0147597 A1* | 5/2015 | Otomo .................... C01B 25/14 429/7 |
| 2017/0324076 A1* | 11/2017 | Lee ..................... H01M 10/052 |

FOREIGN PATENT DOCUMENTS

| JP | 2012-129150 A | 7/2012 |
| JP | 2013-069416 A | 4/2013 |

* cited by examiner

*Primary Examiner* — Muhammad S Siddiquee
(74) *Attorney, Agent, or Firm* — Sughrue Mion, PLLC

(57) ABSTRACT

Disclosed is an anode mixture configured to provide an all-solid-state lithium ion secondary battery being excellent in cycle characteristics when it is used in the battery, an anode including the anode mixture, and an all-solid-state lithium ion secondary battery including the anode. The anode mixture may be an anode mixture for an all-solid-state lithium ion secondary battery, wherein the anode mixture contains an anode active material, a solid electrolyte and an electroconductive material; and wherein a value obtained by multiplying, by a bulk density of the solid electrolyte, a volume percentage (%) of the electroconductive material when a volume of the anode mixture is determined as 100 volume %, is 0.53 or more and 3.0 or less.

5 Claims, 1 Drawing Sheet

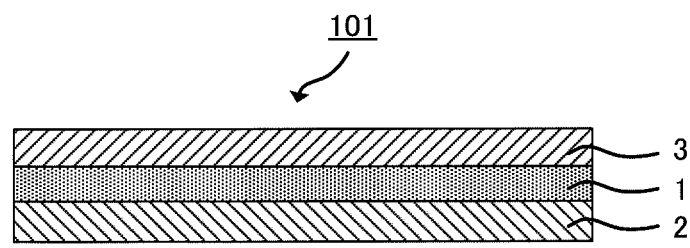

ANODE MIXTURE FOR ALL-SOLID-STATE LITHIUM ION SECONDARY BATTERY, ANODE COMPRISING THE ANODE MIXTURE, AND ALL-SOLID-STATE LITHIUM ION SECONDARY BATTERY COMPRISING THE ANODE

TECHNICAL FIELD

The disclosure relates to an anode mixture for an all-solid-state lithium ion secondary battery, an anode comprising the anode mixture, and an all-solid-state lithium ion secondary battery comprising the anode.

BACKGROUND

An active material (an alloy-based active material) containing a metal such as Si, the metal being able to form an alloy with Li, has a large theoretical capacity per volume compared to carbon-based anode active materials. Therefore, a lithium ion battery using such an alloy-based active material in its anode, has been proposed.

Patent Literature 1 discloses a negative electrode mixture for a secondary battery, the mixture comprising, as a negative electrode active material powder, an alloy-based active material having an average particle diameter of 10 μm or less. Patent Literature 1 also discloses an all-solid lithium ion battery comprising an anode layer that contains the negative electrode active material powder.

Patent Literature 1: Japanese Patent Application Laid-Open No. 2013-69416

However, the all-solid-state lithium ion secondary battery as disclosed in Patent Literature 1 which uses an alloy-based active material as an anode active material, shows a low capacity retention rate when it repeats charge-discharge cycles.

SUMMARY

In light of this circumstance, an object of the disclosed embodiments is to provide an anode mixture configured to provide an all-solid-state lithium ion secondary battery being excellent in cycle characteristics when it is used in the battery, an anode comprising the anode mixture, and an all-solid-state lithium ion secondary battery comprising the anode.

In a first embodiment, there is provided an anode mixture for an all-solid-state lithium ion secondary battery, wherein the anode mixture comprises an anode active material, a solid electrolyte and an electroconductive material; wherein the anode active material comprises at least one active material selected from the group consisting of a metal that is able to form an alloy with Li and an oxide of the metal; wherein the solid electrolyte is a LiX—Li$_2$S—P$_2$S$_5$-based solid electrolyte (where X is at least one halogen selected from the group consisting of F, Cl, Br and I); and wherein a value obtained by multiplying, by a bulk density of the solid electrolyte, a volume percentage (%) of the electroconductive material when a volume of the anode mixture is determined as 100 volume %, is 0.53 or more and 3.0 or less.

The anode active material may comprise elemental silicon.

The electroconductive material may be at least one carbonaceous material selected from the group consisting of carbon black, carbon nanotube and carbon nanofiber.

In another embodiment, there is provided an anode for an all-solid-state lithium ion secondary battery, comprising the anode mixture.

In another embodiment, there is provided an all-solid-state lithium ion secondary battery comprising the anode.

For the anode mixture of the disclosed embodiments, a value obtained by dividing the value of the volume percentage of the electroconductive material by the bulk density of the solid electrolyte is in the specific range. Therefore, an all-solid-state lithium ion secondary battery can be provided, the battery being excellent in cycle characteristics compared to a battery including an anode mixture out of the range.

BRIEF DESCRIPTION OF THE DRAWING

FIG. 1 is a schematic view of an example of the structure of an all-solid-state lithium ion secondary battery.

DETAILED DESCRIPTION

1. Anode Mixture

The anode mixture of the disclosed embodiments is an anode mixture for an all-solid-state lithium ion secondary battery, wherein the anode mixture comprises an anode active material, a solid electrolyte and an electroconductive material; wherein the anode active material comprises at least one active material selected from the group consisting of a metal that is able to form an alloy with Li and an oxide of the metal; wherein the solid electrolyte is a LiX—Li$_2$S—P$_2$S$_5$-based solid electrolyte (where X is at least one halogen selected from the group consisting of F, Cl, Br and I); and wherein a value obtained by multiplying, by a bulk density of the solid electrolyte, a volume percentage (%) of the electroconductive material when a volume of the anode mixture is determined as 100 volume %, is 0.53 or more and 3.0 or less.

The metal that is able to form an alloy with Li is low in ion conductivity and electron conductivity.

Therefore, when the metal is used as an anode active material, generally, an electroconductive material and a solid electrolyte are incorporated in the anode, in combination with the anode active material.

When the metal that is able to form an alloy with Li (hereinafter, the metal that is able to form an alloy with Li may be referred to as M) is used as the anode active material, along with the charging of the lithium ion secondary battery, the reaction represented by the following formula (1), that is, a so-called electrochemical alloying reaction, is initiated in the anode:

$$x\text{Li}^+ + xe^- + y\text{M} \rightarrow \text{Li}_x\text{M}_y \qquad \text{Formula (1)}$$

Along with the discharging of the lithium ion secondary battery, as represented by the following formula (2), an extraction reaction of Li ions from the alloy of Si and Li, is initiated in the anode:

$$\text{Li}_x\text{M}_y \rightarrow x\text{Li}^+ + xe^- + y\text{M} \qquad \text{Formula (2)}$$

The lithium ion secondary battery using the metal that is able to form an alloy with Li as the anode active material, undergoes a large volume change in association with the Li insertion/extraction reactions represented by the formulae (1) and (2).

Patent Literature 1 describes that the average particle diameter of a powder of an ion conductive material (solid electrolyte) may be small because, as the average particle diameter decreases, contact points between the anode active material and the solid electrolyte increase.

However, it was found that when there are many spaces in the anode of the all-solid-state lithium ion secondary battery, aggregation of the electroconductive material is likely to occur in the anode; therefore, in the case of using an alloy-based anode active material such as Si, an electron conducting path in the anode is blocked and, as a result, the capacity retention rate of the battery may deteriorate especially at the initial stage.

The solid electrolyte occupies a large portion of the volume of the anode. For a solid electrolyte having a uniform density, there is such a correlation that the smaller the bulk density, the larger the number of the spaces in the anode. As used herein, the "spaces in the anode" means parts where at least the solid electrolyte does not exist. Therefore, the electroconductive material is unevenly distributed in the anode and narrows the electron conducting path in the area where the amount of the electroconductive material is small.

As just described, in the area where the electron conducting path is narrow, the electron conducting path is gradually cut by repeating a volume change of the alloy-based active material in association with charging and discharging. As a result, it is considered that the capacity retention rate of the lithium ion secondary battery deteriorates.

For the anode mixture of the disclosed embodiments, the value obtained by multiplying the volume percentage of the electroconductive material by the bulk density of the solid electrolyte is 0.53 or more and 3.0 or less. Therefore, by using the anode mixture in an all-solid-state lithium ion secondary battery, uneven distribution of the electroconductive material can be prevented, while maintaining excellent ion conductivity. Therefore, it is considered that the capacity retention rate can be kept high even when the alloy-based active material is used as the anode active material.

The anode mixture comprises an anode active material, a solid electrolyte and an electroconductive material.

(Anode Active Material)

The anode active material comprises at least one active material selected from the group consisting of a metal that is able to form an alloy with Li and an oxide of the metal.

The metal that is able to form an alloy with Li is not particularly limited, as long as it is a metal that can insert/extract Li ions along with the so-called electrochemical alloying reactions represented by the formulae (1) and (2). As the metal element that is able to form an alloy with Li, examples include, but are not limited to, Mg, Ca, Al, Si, Ge, Sn, Pb, Sb and Bi. Of them, the metal that is able to form an alloy with Li may be Si, Ge or Sn, and it may be Si. In the disclosed embodiments, the term "metal" is used as a concept including the following terms that are used for general classification of elements: "metal" and "semimetal".

The anode active material may comprise elemental silicon.

The oxide of the metal that is able to form an alloy with Li, means such an oxide that along with the charging of the lithium ion secondary battery, M is produced in the anode by the electrochemical reaction represented by the following formula (3):

$$x\text{Li}^+ xe^- + y\text{MO} \rightarrow \text{Li}_x\text{O}_y + y\text{M} \qquad \text{Formula (3)}$$

By the electrochemical reaction represented by the formula (1) or (2), Li can be inserted in and extracted from the M produced from the oxide of the metal that is able to form an alloy with Li by the formula (3). Therefore, generally, the oxide of the metal that is able to form an alloy with Li is classified into the category of alloy-based active materials. As with the metal that is able to form an alloy with Li, the oxide of the metal that is able to form an alloy with Li, has such a property that it undergoes a large volume change in association with the Li insertion/extraction reactions.

As the oxide of the metal that is able to form an alloy with Li, examples include, but are not limited to, SiO and SnO. The oxide may be SiO.

The percentage of the anode active material in the anode mixture is not particularly limited. For example, it may be 40 mass % or more, may be in a range of from 50 mass % to 90 mass %, or may be in a range of from 50 mass % to 70 mass %.

The form of the metal that is able to form an alloy with Li and the oxide of the metal, is not particularly limited. As the form, examples include, but are not limited to, a particle form and a film form.

(Solid Electrolyte)

A raw material for the solid electrolyte is a LiX—Li$_2$S—P$_2$S$_5$-based solid electrolyte. X is at least one halogen selected from the group consisting of F, Cl, Br and I.

As the LiX—Li$_2$S—P$_2$S$_5$-based solid electrolyte, examples include, but are not limited to, LiI—Li$_2$S—P$_2$S$_5$, LiCl—Li$_2$S—P$_2$S$_5$, and LiF—Li$_2$S—P$_2$S$_5$. Of them, the LiX—Li$_2$S—P$_2$S$_5$-based solid electrolyte may be LiI—Li$_2$S—P$_2$S$_5$. The densities of these solid electrolytes are almost the same.

The percentage of the solid electrolyte in the anode mixture is not particularly limited. For example, it may be 10 mass % or more, may be in a range of from 20 mass % to 50 mass %, or may be in a range of from 25 mass % to 45 mass %.

The density of the raw material for the solid electrolyte may be from 2.0 to 2.5 g/cm$^3$. If the density is in this range, the effect of the disclosed embodiments can be exerted as long as the C*B value is in a specific range described below.

In the disclosed embodiments, the value obtained by multiplying the volume percentage of the electroconductive material in the anode mixture by the bulk density of the solid electrolyte, is 0.53 or more and 3.0 or less. Therefore, the electroconductive material can be kept in an evenly dispersed state in the anode produced from the anode mixture. Hereinafter, the value obtained by multiplying the volume percentage (C) of the electroconductive material by the bulk density (B) of the solid electrolyte, may be referred to as a C*B value.

The volume percentage of the electroconductive material is a value when the volume of the anode mixture is determined as 100 volume %.

In the disclosed embodiments, the bulk density of the solid electrolyte is measured as follows. First, a specific mass of the solid electrolyte is put in a graduated cylinder having an appropriate capacity. Next, after the lateral surface of the graduated cylinder is tapped 50 times, the volume of the solid electrolyte is read on the cylinder graduation. A value is obtained by dividing the mass (g) of the solid electrolyte by the volume (cm$^3$) read on the cylinder graduation, and the value is determined as the bulk density (g/cm$^3$) of the solid electrolyte.

In the disclosed embodiments, the C*B value is an index of balance between the volume percentage of the electroconductive material in the anode mixture and the bulk density of the solid electrolyte. When the C*B value is too low or too high, the following problem occurs.

When the C*B value is less than 0.53, it means that at least any one of the volume percentage of the electroconductive material in the anode mixture and the bulk density of the solid electrolyte is too low. In the case where at least the volume percentage of the electroconductive material is too low, many spaces are produced in the anode mixture. In the case where at least the bulk density of the solid electrolyte is too low, the electroconductive material is incorporated to the inside of the solid electrolyte or into spaces between particles of the solid electrolyte. In both cases, the area where the electroconductive material is distributed is limited. Therefore, the electroconductive material is unevenly distributed and, as a result, narrows the electron conducting path in the area where the amount of the electroconductive material is small, which leads to a decrease in capacity retention rate.

On the other hand, when the C*B value is more than 3.0, the volume percentage of the electroconductive material is too large. Therefore, a problem occurs in the lithium ion conducting path, rather than the electron conducting path in the anode mixture, and results in an increase in resistance.

To maintain the ion conducting path and the electron conducting path with balance, the C*B value may be 0.60 or more and 2.9 or less, or it may be 0.70 or more and 2.8 or less.

By calculating the volume percentage of the electroconductive material and the bulk density of the solid electrolyte in advance, a rough prediction can be made on the balance between the ion conducting path and electron conducting path in the anode to be obtained.

For example, even when the bulk density of the solid electrolyte is low, the C*B value may be in a range of from 0.53 to 3.0 as long as the anode mixture contains a sufficient amount of the electroconductive material. As a result, it can be predicted that both the ion conducting path and the electron conducting path are ensured with balance in the anode to be obtained.

Also, for example, when the amount of the electroconductive material in the anode mixture is decreased, the C*B value may be in a range of from 0.53 to 3.0 as long as the bulk density of the solid electrolyte is high. As a result, it can be predicted that, as with the above case, both the ion conducting path and the electron conducting path are ensured with balance.

By referring to the C*B value, the volume percentage of the electroconductive material can be determined depending on the bulk density of the solid electrolyte used. Therefore, a battery that is less likely to cause a decrease in capacity, can be produced.

An example of the method for preparing the solid electrolyte will be described below. First, the LiX—Li$_2$S—P$_2$S$_5$-based solid electrolyte, a dispersion medium, and dispersing balls are put in a container. Mechanical milling is carried out using the container, thereby pulverizing the LiX—Li$_2$S—P$_2$S$_5$-based solid electrolyte. A mixture thus obtained is appropriately heated, thereby obtaining the solid electrolyte.

(Electroconductive Material)

The electroconductive material is not particularly limited, as long as it is an electroconductive material that is, in the anode, applicable to the all-solid-state lithium ion secondary battery. As the raw material for the electroconductive material, examples include, but are not limited to, at least one carbonaceous material selected from the group consisting of carbon black (e.g., acetylene black and furnace black), carbon nanotube and carbon nanofiber.

From the viewpoint of electron conductivity, the raw material may be at least one carbonaceous material selected from the group consisting of carbon nanotube and carbon nanofiber. The carbon nanotube and carbon nanofiber may be vapor-grown carbon fiber (VGCF).

When the volume of the anode mixture is determined as 100 volume %, the volume percentage of the electroconductive material may be 1 volume % or more. As just described, by using the electroconductive material of 1 volume % or more, many electron conducting paths can be ensured in the anode to be obtained.

In the disclosed embodiments, the volume percentage of each material in the anode mixture is a value calculated from the true density of the material. In the calculation of the volume percentage, spaces in the anode mixture are not taken into account.

In addition to the above-mentioned components, the anode mixture may contain other components such as a binder. This is because the presence or absence of the binder in the anode mixture does not affect the effect of preventing the electroconductive material from being unevenly distributed on the solid electrolyte surface.

As the binder, examples include, but are not limited to, polyvinylidene fluoride (PVdF), polytetrafluoroethylene (PTFE), butylene rubber (BR), styrene-butadiene rubber (SBR), polyvinyl butyral (PVB) and acrylic resin. The binder may be polyvinylidene fluoride (PVdF).

When the volume percentage of the anode mixture is determined as 100 volume %, the volume ratio of the binder may be 0.3 volume % or more and 9.0 volume % or less, or it may be 1.0 volume % or more and 4.0 volume % or less.

Since a high energy density is obtained, the anode of the disclosed embodiments may be an anode in which the volume percentage of components other than the anode active material, is small.

The method for forming the anode mixture is not particularly limited. As the method for forming the anode mixture, examples include, but are not limited to, a method for compression-forming a powder of the raw material for the anode mixture. In the case of compression-forming the powder of the raw material for the anode mixture, generally, a press pressure of from about 400 to about 1,000 MPa is applied. The compression-forming may be carried out by using a roll press. In this case, a line pressure may be set to 10 to 100 kN/cm.

Also, the following methods can be adopted: a method in which a powder of the raw material for the anode mixture containing the removable binder, is subjected to compression forming and then sintered to remove the binder, and a method in which a dispersion of the raw material for the anode mixture containing the solvent and the removable binder, is applied on the solid electrolyte material part or on a different support, dried, formed into the anode mixture and then sintered to remove the binder.

2. Anode

The anode of the disclosed embodiments comprises the anode mixture.

In addition to the anode mixture, the anode may further contain an anode current collector, for example.

The anode is used for the production of an all-solid-state lithium ion secondary battery described below.

3. All-solid-state Lithium Ion Secondary Battery

The structure of the all-solid-state lithium ion secondary battery of the disclosed embodiments is not particularly limited, as long as the battery functions as a secondary battery and comprises the anode. As shown in FIG. 1, typically, the all-solid-state lithium ion secondary battery of the disclosed embodiments comprises a cathode 2, an anode 3 and a solid electrolyte layer 1 disposed between the cathode 2 and the anode 3, which form a cathode-solid electrolyte layer-anode assembly 101. The cathode-solid electrolyte layer-anode assembly 101 is an assembly of members having the following array structure: the cathode, the solid electrolyte layer and the anode are arranged in this order; they may be directly attached or indirectly attached through a part composed of a different material; and a part composed of a different material may be attached to one or both of the opposite side of the cathode to the position where the solid electrolyte layer is present (the outer side of the cathode) and the opposite side of the anode to the position where the solid electrolyte layer is present (the outer side of the anode).

By attaching other members such as a current collector to the cathode-solid electrolyte layer-anode assembly 101, a cell, which is a functional unit of an all-solid-state battery, is obtained. The cell can be used as it is as an all-solid-state lithium ion battery, or a plurality of the cells can be electrically connected to form a cell assembly and used as the all-solid-state lithium ion battery of the disclosed embodiments.

For the cathode-solid electrolyte layer-anode assembly, generally, the thicknesses of the cathode and the anode are in a range of from about 0.1 μm to about 10 mm, and the thickness of the solid electrolyte layer is in a range of from about 0.01 μm to about 1 mm.

3-1. Cathode The cathode is not particularly limited, as long as it is a cathode that functions as the cathode of the all-solid-state lithium ion secondary battery. In general, the cathode contains a Li-containing cathode active material. As needed, the cathode contains other components such as a binder, a solid electrolyte and an electroconductive material.

In the disclosed embodiments, the Li-containing cathode active material is not particularly limited, as long as it is an active material that contains a Li element. A substance can be used as the cathode active material without particular limitation, as long as it functions as the cathode active material in an electrochemical reaction in relation to the anode active material, and it promotes an electrochemical reaction that involves Li ion transfer. Also, a substance that is known as the cathode active material of a lithium ion battery, can be used in the disclosed embodiments.

The raw material for the cathode active material is not particularly limited, as long as it is a raw material that is applicable to the all-solid-state lithium ion secondary battery. As the raw material, examples include, but are not limited to, lithium cobaltate ($LiCoO_2$), lithium nickelate ($LiNiO_2$), lithium manganate ($LiMn_2O_4$), a different element-substituted Li—Mn spinel of the composition represented by $Li_{1+x}Ni_{1/3}Mn_{1/3}Co_{1/3}O_2$, $Li_{1+x}Mn_{2-x-y}M_yO_4$ (where M is one or more elements selected from Al, Mg, Co, Fe, Ni and Zn), lithium titanate ($Li_xTiO_y$) and lithium metal phosphate ($LiMPO_4$, M=Fe, Mn, Co, Ni, etc.) The cathode active material may include a coating layer which has lithium ion conductivity and which contains a substance that is not fluidized even when it is in contact with the active material or solid electrolyte. As the substance, examples include, but are not limited to, $LiNbO_3$, $Li_4Ti_5O_{12}$ and $Li_3PO_4$.

The form of the cathode active material is not particularly limited. It may be a film form or particle form.

The percentage of the cathode active material in the cathode is not particularly limited. For example, it may be 60 mass % or more, may be in a range of from 70 mass % to 95 mass %, or may be in a range of from 80 mass % to 90 mass %.

As the raw material for the solid electrolyte, the raw material for the electroconductive material and the raw material for the binder, the same materials as those used in the anode, can be used.

3-2. Solid Electrolyte Layer

The solid electrolyte layer is not particularly limited, as long as it is a solid electrolyte layer that functions as the solid electrolyte of the all-solid-state lithium secondary battery. In general, the solid electrolyte layer contains a solid electrolyte raw material. As needed, it contains other components such as a binder.

As the raw material for the solid electrolyte and the raw material for the binder, the same materials as those used in the anode, can be used.

The percentage of the solid electrolyte raw material in the solid electrolyte layer is not particularly limited. For example, it may be 50 mass % or more, may be in a range of from 70 mass % to 99.99 mass %, or may be in a range of from 90 mass % to 99.9 mass %.

4. Method for Producing the all-Solid-State Lithium Ion Secondary Battery

The method for producing the all-solid-state lithium ion secondary battery according to the disclosed embodiments, is not particularly limited, as long as it is a method by which the all-solid-state lithium ion secondary battery of the disclosed embodiments can be produced. For example, the all-solid-state lithium ion secondary battery of the disclosed embodiments can be assembled by using a cathode mixture, a solid electrolyte material part, and an anode mixture that contains an anode active material, an electroconductive material and a solid electrolyte.

In the production method of the disclosed embodiments, the above-mentioned anode mixture is used.

Hereinafter, the cathode mixture and the solid electrolyte material part will be described.

4-1. Cathode Mixture

In the production method of the disclosed embodiments, the cathode mixture contains, for example, a Li-containing cathode active material. As needed, it contains other raw materials such as a binder, a solid electrolyte and an electroconductive material.

As the other raw materials such as the binder, the electroconductive material and the solid electrolyte, the same raw materials as those exemplified above in "3-1. Cathode" can be used.

The raw material for forming the cathode mixture, that is, the raw material for the cathode mixture may further contain components that are removed in the process of forming the cathode mixture. As the components that are contained in the raw material for the cathode mixture and removed in the process of forming the cathode mixture, examples include, but are not limited to, the same components as the solvent that can be incorporated in the raw material for the anode mixture and the removable binder.

As the method for forming the cathode mixture, examples include, but are not limited to, the same method as the method for forming the anode mixture.

4-2. Solid Electrolyte Material Part

In the production method of the disclosed embodiments, the solid electrolyte material part contains a solid electrolyte raw material, for example. As needed, it contains other components.

As the solid electrolyte raw material, the same materials as those exemplified above in "3-2. Solid electrolyte layer" can be used.

The percentage of the solid electrolyte raw material in the solid electrolyte material part is not particularly limited. For example, it may be 50 mass % or more, may be in a range of from 70 mass % to 99.99 mass %, or may be in a range of from 90 mass % to 99.9 mass %.

As the other components contained in the solid electrolyte material part, the same materials as those exemplified above in "3-2. Solid electrolyte layer" can be used.

As the method for forming the solid electrolyte material part, examples include, but are not limited to, a method for compression-forming a powder of the solid electrolyte material containing the solid electrolyte raw material and, as needed, other components. In the case of compression-forming the powder of the solid electrolyte material, generally, as with the case of compression-forming the powder of the anode mixture, a press pressure of from about 400 to about 1,000 MPa is applied. The compression-forming may be carried out by using a roll press. In this case, a line pressure may be set to 10 to 100 kN/cm.

As a different method, a cast film forming method can be used, which uses a solution or dispersion of the solid electrolyte material that contains the solid electrolyte raw material and, as needed, other components.

In the production method of the disclosed embodiments, the all-solid-state lithium ion secondary battery is an assembly of members having the following array structure, for example: the cathode mixture, the solid electrolyte material part and the anode mixture are arranged in this order; they may be directly attached or indirectly attached through a part composed of a different material; and a part composed of a different material may be attached to one or both of the opposite side of the cathode mixture to the position where the solid electrolyte material part is present (the outer side of the cathode mixture) and the opposite side of the anode mixture to the position where the solid electrolyte material part is present (the outer side of the anode mixture) (i.e., a cathode mixture-solid electrolyte material part-anode mixture assembly).

A part composed of a different material may be attached to the all-solid-state lithium ion secondary battery, as long as Li ions can be passed in the direction from the cathode mixture side to the anode mixture side through the solid electrolyte material part. A coating layer such as $LiNbO_3$, $Li_4Ti_5O_{12}$ or $Li_3PO_4$ may be disposed between the cathode mixture and the solid electrolyte material part. A current collector, an outer casing, etc., may be attached to one or both of the outer side of the cathode mixture and the outer side of the anode mixture.

The all-solid-state lithium ion secondary battery is typically an assembly having the following array structure: the cathode mixture, the anode mixture and the solid electrolyte material part disposed between the cathode mixture and the anode mixture are directly attached, and a part composed of a different material is not attached to both the outer side of the cathode mixture and the outer side of the anode mixture.

The method for producing the all-solid-state lithium ion secondary battery is not particularly limited. For example, the all-solid-state lithium ion secondary battery may be produced as follows: the powder of the raw material for the anode mixture is put in a compression cylinder for powder compression forming and deposited to a uniform thickness, thereby forming a layer of the powder of the raw material for the anode mixture; a powder of the raw material for the solid electrolyte, which contains the solid electrolyte powder and, as needed, other components, is placed on the layer of the powder of the raw material for the anode mixture and deposited to a uniform thickness, thereby forming a layer of the powder of the raw material for the solid electrolyte; a powder of the raw material for the cathode mixture, which contains the Li-containing cathode active material, is placed on the layer of the powder of the raw material for the solid electrolyte and deposited to a uniform thickness, thereby forming a layer of the powder of the raw material for the cathode mixture; and a powder deposit composed of the three powder deposited layers formed in this manner, is subjected to compression-forming at once, thereby producing the all-solid-state lithium ion secondary battery.

The solid electrolyte material part, the anode mixture and the cathode mixture may be produced by a method other than the powder compression forming. Details of the method are as described above. For example, the solid electrolyte material part may be formed by the cast film forming method or a coating method with a die coater, using the solution or dispersion of the solid electrolyte material containing the solid electrolyte raw material. The anode mixture and the cathode mixture may be formed by the following method, for example: a method in which the dispersion containing the powder of the raw material for the anode mixture or cathode mixture and the removable binder, is applied on the solid electrolyte material part to form a coating film, and the coating film is heated to remove the binder from the coating film, or a method in which the powder containing the raw material for the anode mixture or cathode mixture and the removable binder, is subjected to compression forming to form the powder into the cathode mixture or anode mixture, and the thus-formed product is heated to remove the binder from the coating film. To increase electrode density, the anode mixture and the cathode mixture may be subjected to densification pressing in advance before the compression forming.

The anode mixture and the cathode mixture may be formed on a support other than the solid electrolyte material part. In this case, the anode mixture and the cathode mixture are removed from the support, and the removed anode mixture or cathode mixture is attached on the solid electrolyte material part.

In the all-solid-state lithium ion secondary battery of the disclosed embodiments, the cathode mixture functions as the cathode; the anode mixture functions as the anode; and the solid electrolyte material part functions as the solid electrolyte layer. As described above, the anode may be a combination of the anode mixture and the anode current collector, and the cathode may be a combination of the cathode mixture and the cathode current collector.

The method for passing electricity through the all-solid-state lithium ion secondary battery is not particularly limited. Current density may be in a range of from 0.1 to 6.0 mA/cm$^2$, or voltage may be in a range of from 4.3 to 4.7 V (vs Li/Li$^+$).

By passing electricity, the electrochemical alloying reaction as represented by the formula (2) is initiated. As a result, the metal in the anode active material reacts with lithium ions to produce an alloy of the metal and Li.

An example of the method for calculating the discharge capacity retention rate of the all-solid-state lithium ion secondary battery according to the disclosed embodiments, will be described below.

First, the battery is charged with constant current-constant voltage until a predetermined voltage is reached.

Next, the charged battery is discharged with constant current-constant voltage. The charging and discharging are determined as one cycle, and X cycles are repeated.

The discharge capacity retention rate after X cycles is calculated by the following formula (4):

$$r = (C_X/C_{2nd}) \times 100 \qquad \text{Formula (4)}$$

In the formula (4), r is the discharge capacity retention rate (%) after X cycles; $C_X$ is the discharge capacity (mAh) at the X-th cycle; and $C_{2nd}$ is the discharge capacity (mAh) at the second cycle. The value of X is not particularly limited; however, since the initial discharge capacity retention rate is easily influenced by uneven distribution of the electroconductive material in the anode, X may be 12 or less, or it may be 6.

EXAMPLES

Hereinafter, the disclosed embodiments will be further clarified by the following examples. The disclosed embodiments are not limited to the following examples, however.
1. Production of all-Solid-State Lithium Ion Secondary Battery Example 1

(1) The Step of Forming Solid Electrolyte Particles for Anode

The following materials were put in the slurry tank of a bead mill (product name: LMZ4, manufactured by: Ashizawa Finetech Ltd.)

Sulfide-based solid electrolyte (15LiBr-10LiI-75(75$Li_2S$-25$P_2S_5$)): 800 g
Dehydrated heptane: 5 kg
Di-n-butyl ether: 1.5 kg
$ZrO_2$ balls (diameter 0.3 mm): 13 kg The slurry tank containing the above materials was subjected to wet mechanical milling for 10 minutes at a peripheral speed of 12 m/s, thereby pulverizing the sulfide solid electrolyte. Then, a mixture thus obtained was heated at 210° C. for 3 hours on a hot plate, thereby obtaining solid electrolyte particles for an anode.

Next, 10 g of the solid electrolyte particles for the anode were put in a graduated cylinder (100 $cm^3$). After the lateral surface of the graduated cylinder was tapped 50 times, the volume of the solid electrolyte particles was read on the cylinder graduation. The bulk density B of the solid electrolyte particles for the anode calculated from the volume, was 0.33 $g/cm^3$.

(2) The Step of Forming Anode Mixture

The following raw materials for an anode were put in a container.

Anode active material: Si particles (average particle diameter: 5 μm)
Sulfide-based solid electrolyte: The above-mentioned solid electrolyte particles for the anode
Electroconductive material: VGCF
Binder: 5 Mass % butyl butyrate solution of a PVdF-based binder The content of the electroconductive material in the mixture of the above-mentioned raw materials for the anode, was controlled so that the volume percentage of the electroconductive material is 9.2 volume % when the total volume of an anode mixture thus obtained is determined as 100%.

The mixture in the container was stirred for 30 seconds by an ultrasonic disperser. Next, the container was shaken for 30 minutes by a shaker, thereby preparing a raw material for an anode mixture.

The raw material for the anode mixture was applied on one surface of a copper foil (an anode current collector) by a blade method using an applicator. The applied raw material for the anode mixture was dried on the hot plate at 100° C. for 30 minutes, thereby forming an anode mixture.

(3) The Step of Forming Cathode Mixture

The following raw materials for a cathode were put in a container.

Cathode active material: $LiNi_{1/3}Co_{1/3}Mn_{1/3}O_2$ particles (average particle diameter: 4 μm)

Sulfide-based solid electrolyte: $Li_2S$—$P_2S_5$-based glass ceramics particles containing LiBr and LiI (average particle diameter: 0.8 μm)
Electroconductive material: VGCF
Binder: 5 Mass % butyl butyrate solution of a PVdF-based binder The mixture in the container was stirred for 30 seconds by the ultrasonic disperser. Next, the container was shaken for 3 minutes by the shaker. The mixture in the container was further stirred for 30 seconds by the ultrasonic disperser, thereby preparing a raw material for a cathode mixture.

The raw material for the cathode mixture was applied on one surface of an aluminum foil (a cathode current collector) by the blade method using the applicator. The applied raw material for the cathode mixture was dried on the hot plate at 100° C. for 30 minutes, thereby forming a cathode mixture.

(4) The Step of Producing Battery

The following raw materials for a solid electrolyte were put in a container.

Sulfide-based solid electrolyte: $Li_2S$—$P_2S_5$-based glass particles containing LiBr and LiI (average particle diameter: 2.5 μm)
Binder: 5 Mass % heptane solution of a BR-based binder The mixture in the container was stirred for 30 seconds by the ultrasonic disperser. Next, the container was shaken for 3 minutes by the shaker. A solid electrolyte material part thus obtained was applied to an aluminum foil by a die coater and dried on the hot plate at 100° C. for 30 minutes (a solid electrolyte layer). A total of three solid electrolyte layers were produced.

A stack of the cathode mixture and the cathode current collector was pressed in advance, thereby obtaining a laminate. The solid electrolyte material part was applied on the cathode mixture-side surface of the laminate by the die coater and dried on the hot plate at 100° C. for 30 minutes, thereby obtaining a cathode side laminate I (solid electrolyte material part/cathode mixture/cathode current collector).

In the same manner, a stack of the anode mixture and the anode current collector was subjected to advance pressing, and the solid electrolyte material part was applied and dried, thereby obtaining an anode side laminate I (solid electrolyte material part/anode mixture/anode current collector).

To the solid electrolyte material part side of the cathode side laminate I, the solid electrolyte layer on the aluminum foil was further attached. While being in this state, they were subjected to densification pressing under the following condition. By the densification pressing, the solid electrolyte layer on the aluminum foil was integrated with the solid electrolyte material part of the cathode side laminate I.

Pressure: 5 kN/cm
Roll gap: 100 μm
Feed rate: 0.5 m/min

Then, the aluminum foil on the solid electrolyte layer side was peeled off, thereby obtaining a cathode side laminate II (solid electrolyte material part/cathode mixture/cathode current collector).

To the solid electrolyte material part side of the anode side laminate I, the solid electrolyte layer on the aluminum foil was further attached. While being in this state, they were subjected to densification pressing under the following condition. By the densification pressing, the solid electrolyte layer on the aluminum foil was integrated with the solid electrolyte material part of the anode side laminate I.

Pressure: 5 kN/cm
Roll gap: 100 μm
Feed rate: 0.5 m/min

Then, the aluminum foil on the solid electrolyte layer side was peeled off, thereby obtaining an anode side laminate II (solid electrolyte material part/anode mixture/anode current collector).

The cathode side laminate II subjected to the densification pressing, was punched into a disk by a jig (diameter: 11.28 mm). The anode side laminate II subjected to the densification pressing, was punched into a disk by a jig (diameter: 11.74 mm).

To the solid electrolyte material part side of the anode side laminate II, the solid electrolyte layer on the aluminum foil was further transferred. Then, the aluminum foil was peeled off, thereby obtaining an anode side laminate III (solid electrolyte material part/anode mixture/anode current collector).

The cathode side laminate II and the anode side laminate III were stacked so that their surfaces on each of which the solid electrolyte material part was formed, were in contact with each other. Also, the cathode side laminate II was arranged at the approximate center of the anode side laminate III. They were subjected to hot pressing under the following condition, thereby obtaining the all-solid-state lithium ion secondary battery of Example 1.
  Pressure: 200 MPa
  Temperature: 130° C.
  Pressing time: 1 minute Examples 2 and 3

The all-solid-state lithium ion secondary batteries of Examples 2 and 3 were each produced in the same manner as Example 1, except that the content of the electroconductive material in the mixture of the raw materials for the anode, was controlled so that, in "(2) The step of forming anode mixture" of Example 1, the volume percentage of the electroconductive material is 4.8 volume % or 2.5 volume % when the total volume of the anode mixture thus obtained is determined as 100%.

Example 4

The all-solid-state lithium ion secondary battery of Example 4 was produced in the same manner as Example 1, except that "(1) The step of forming solid electrolyte particles for anode" was changed to the following process.

The following materials were put in the slurry tank of a bead mill (product name: LMZ015, manufactured by: Ashizawa Finetech Ltd.)
  Sulfide-based solid electrolyte (15LiBr-10LiI-75(75Li$_2$S-25P$_2$S$_5$)): 30 g
  Dehydrated heptane: 200 g
  Di-n-butyl ether: 80 g
  ZrO$_2$ balls (diameter 0.3 mm): 450 g The slurry tank containing the above materials was subjected to wet mechanical milling for 4 hours at a peripheral speed of 16 m/s, thereby pulverizing the sulfide-based solid electrolyte. Then, a mixture thus obtained was heated at 210° C. for 3 hours on the hot plate, thereby obtaining solid electrolyte particles for an anode.

The bulk density B of the solid electrolyte particles for the anode calculated by the same method as Example 1, was 0.21 g/cm$^3$.

Examples 5 and 6

The all-solid-state lithium ion secondary batteries of Examples 5 and 6 were each produced in the same manner as Example 4, except that the content of the electroconductive material in the mixture of the raw materials for the anode, was controlled so that, in "(2) The step of forming anode mixture" of Example 4 (see Example 1), the volume percentage of the electroconductive material is 4.8 volume % or 2.5 volume % when the total volume of the anode mixture thus obtained is determined as 100%.

Example 7

The all-solid-state lithium ion secondary battery of Example 7 was produced in the same manner as Example 1, except that "(1) The step of forming solid electrolyte particles for anode" was changed to the following process.

The following materials were put in the slurry tank of the beads mill (product name: LMZ4, manufactured by: Ashizawa Finetech Ltd.)
  Sulfide-based solid electrolyte (15LiBr-10LiI-75(75Li$_2$S-25P$_2$S$_5$): 800 g
  Dehydrated heptane: 5 kg
  Di-n-butyl ether: 1.5 kg
  ZrO$_2$ balls (diameter 0.3 mm): 13 kg The slurry tank containing the above materials was subjected to wet mechanical milling for 4 hours at a peripheral speed of 12 m/s, thereby pulverizing the sulfide-based solid electrolyte. Then, a mixture thus obtained was heated at 210° C. for 3 hours on the hot plate, thereby obtaining solid electrolyte particles for an anode.

The bulk density B of the solid electrolyte particles for the anode calculated by the same method as Example 1, was 0.19 g/cm$^3$.

Examples 8 and 9

The all-solid-state lithium ion secondary batteries of Examples 8 and 9 were each produced in the same manner as Example 7, except that the content of the electroconductive material in the mixture of the raw materials for the anode, was controlled so that, in "(2) The step of forming anode mixture" of Example 7 (see Example 1), the volume percentage of the electroconductive material is 4.8 volume % or 3.7 volume % when the total volume of the anode mixture thus obtained is determined as 100%.

Example 10

The all-solid-state lithium ion secondary battery of Example 10 was produced in the same manner as Example 1, except that "(1) The step of forming solid electrolyte particles for anode" was changed to the following process.

The following materials were put in a ZrO$_2$ pod (45 mL).
  Sulfide-based solid electrolyte (15LiBr-10LiI-75(75Li$_2$S-25P$_2$S$_5$): 2 g
  Dehydrated heptane: 7 g
  Di-n-butyl ether: 1 g
  ZrO$_2$ balls (diameter 1 mm): 40 g The inside of the ZrO$_2$ pod containing these materials, was filled with an argon atmosphere. Then, the pod was hermetically closed, absolutely. The ZrO$_2$ pod was installed in a planetary ball mill (product name: P7, manufactured by: FRITSCH) and subjected to wet mechanical milling for 5 hours at a plate rotational frequency of 200 rpm, thereby pulverizing the sulfide-based solid electrolyte. Then, a mixture thus obtained was heated at 210° C. for 3 hours on the hot plate, thereby obtaining solid electrolyte particles for an anode.

The bulk density B of the solid electrolyte particles for the anode calculated by the same method as Example 1, was 0.57 g/cm³.

Example 11

The all-solid-state lithium ion secondary battery of Example 11 was produced in the same manner as Example 1, except that "(1) The step of forming solid electrolyte particles for anode" was changed to the following process.

The following materials were put in the slurry tank of the beads mill (product name: LMZ4, manufactured by: Ashizawa Finetech Ltd.)

Sulfide-based solid electrolyte (15LiBr-10LiI-75(75Li$_2$S-25P$_2$S$_5$)): 800 g
Dehydrated heptane: 5 kg
Di-n-butyl ether: 1.5 kg
ZrO$_2$ balls (diameter 0.3 mm): 13 kg The slurry tank containing the above materials was subjected to wet mechanical milling for 6 hours at a peripheral speed of 12 m/s, thereby pulverizing the sulfide-based solid electrolyte. Then, a mixture thus obtained was heated at 210° C. for 3 hours on the hot plate, thereby obtaining solid electrolyte particles for an anode.

The bulk density B of the solid electrolyte particles for the anode calculated by the same method as Example 1, was 0.33 g/cm³.

Comparative Example 1

The all-solid-state lithium ion secondary battery of Comparative Example 1 was produced in the same manner as Example 4, except that the content of the electroconductive material in the mixture of the raw materials for the anode, was controlled so that, in "(2) The step of forming anode mixture" (see Example 1), the volume percentage of the electroconductive material is 1.2 volume % when the total volume of the anode mixture thus obtained is determined as 100%.

2. Discharge Test

For battery performance evaluation, the 12 all-solid-state lithium ion secondary batteries underwent a discharge test by the following method.

First, each battery was charged with constant current-constant voltage at a 3-hour rate (⅓ C) until a predetermined voltage was reached. At this time, a cutoff current was set to ¹/₁₀₀ C. Next, the charged battery was discharged with constant current-constant voltage.

The charging and discharging were determined as one cycle, and 6 cycles were repeated.

The discharge capacity retention rate after 5 cycles was calculated by the following formula (4a):

$$r = (C_6/C_{2nd}) \times 100 \qquad \text{Formula (4a)}$$

In the formula (4a), r is the discharge capacity retention rate (%) after 5 cycles; $C_6$ is the discharge capacity (mAh) at the 6th cycle; and $C_{2nd}$ is the discharge capacity (mAh) at the second cycle.

The discharge capacity retention rate after 5 cycles of each of Examples 1 to 11 when the discharge capacity retention rate after 5 cycles of Comparative Example 1 is determined as 100%, was calculated and determined as the specific capacity retention rate after 5 cycles of each of Examples 1 to 11.

The following Table 1 shows the specific capacity retention rates after 5 cycles of Examples 1 to 11 and Comparative Example 1, for comparison, along with the properties of the solid electrolyte particles for the anode and the volume percentage of the electroconductive material.

TABLE 1

| | Solid electrolyte particles for anode | | | | | |
|---|---|---|---|---|---|---|
| | BET specific surface area (m²/g) | Average particle diameter (μm) | Bulk density B (g/cm³) | Volume percentage C (volume %) of electroconductive material | C*B | Specific capacity retention rate (%) after 5 cycles |
| Example 1 | 5.7 | 2.0 | 0.33 | 9.2 | 2.99 | 131 |
| Example 2 | 5.7 | 2.0 | 0.33 | 4.8 | 1.56 | 131 |
| Example 3 | 5.7 | 2.0 | 0.33 | 2.5 | 0.81 | 131 |
| Example 4 | 28.4 | 1.0 | 0.21 | 9.2 | 1.96 | 131 |
| Example 5 | 28.4 | 1.0 | 0.21 | 4.8 | 1.02 | 130 |
| Example 6 | 28.4 | 1.0 | 0.21 | 2.5 | 0.53 | 127 |
| Example 7 | 13.4 | 1.6 | 0.19 | 9.2 | 1.79 | 131 |
| Example 8 | 13.4 | 1.6 | 0.19 | 4.8 | 0.93 | 131 |
| Example 9 | 13.4 | 1.6 | 0.19 | 3.7 | 0.72 | 131 |
| Example 10 | 1.8 | 3.3 | 0.57 | 2.5 | 1.43 | 131 |
| Example 11 | 19.7 | 1.3 | 0.33 | 2.5 | 0.83 | 131 |
| Comparative Example 1 | 28.4 | 1.0 | 0.21 | 1.2 | 0.26 | 100 |

3. Conclusion

As a result of comparing the specific capacity retention rates after 5 cycles shown in Table 1, Examples 1 to 11 are about 1.3 times higher than Comparative Example 1. This is because, while the C*B value of Comparative Example 1 is as low as 0.26, the C*B values of Examples 1 to 11 are as high as 0.53 or more and 2.99 or less.

Therefore, it was proved that by using such an anode mixture that the value (C*B value) obtained by multiplying, by the bulk density B of the solid electrolyte, the volume percentage C of the electroconductive material when the volume of the anode mixture is determined as 100 volume %, is in a range of from 0.53 to 3.0, the resulting battery can inhibit a decrease in capacity and is excellent in cycle characteristics compared to the case of using an anode mixture out of the range.

REFERENCE SIGNS LIST

1. Solid electrolyte layer
2. Cathode

3. Anode
101. Cathode-solid electrolyte layer-anode assembly

The invention claimed is:

1. An anode mixture for an all-solid-state lithium ion secondary battery,
   wherein the anode mixture comprises an anode active material, a solid electrolyte and an electroconductive material;
   wherein the anode active material comprises at least one active material selected from the group consisting of a metal that is able to form an alloy with Li and an oxide of the metal;
   wherein the solid electrolyte is a $LiX$—$Li_2S$—$P_2S_5$-based solid electrolyte (where X is at least one halogen selected from the group consisting of F, Cl, Br and I); and
   wherein a value obtained by multiplying, by a bulk density of the solid electrolyte, a volume percentage (%) of the electroconductive material based on a 100 volume % of the anode mixture, is 0.53 or more and 3.0 or less.

2. The anode mixture according to claim 1, wherein the anode active material comprises elemental silicon.

3. The anode mixture according to claim 1, wherein the electroconductive material is at least one carbonaceous material selected from the group consisting of carbon black, carbon nanotube and carbon nanofiber.

4. An anode for an all-solid-state lithium ion secondary battery, comprising the anode mixture defined by claim 1.

5. An all-solid-state lithium ion secondary battery comprising the anode defined by claim 4.

* * * * *